US007366637B2

(12) United States Patent
Goto et al.

(10) Patent No.: US 7,366,637 B2
(45) Date of Patent: Apr. 29, 2008

(54) FORM MEASURING INSTRUMENT

(75) Inventors: Tomonori Goto, Sapporo (JP);
Toshiyuki Tamai, Sapporo (JP)

(73) Assignee: Mitutoyo Corporation, Kanagawa (JP)

( * ) Notice: Subject to any disclaimer, the term of this patent is extended or adjusted under 35 U.S.C. 154(b) by 0 days.

(21) Appl. No.: 11/593,081

(22) Filed: Nov. 6, 2006

(65) Prior Publication Data

US 2007/0118329 A1  May 24, 2007

(30) Foreign Application Priority Data

Nov. 8, 2005  (JP) .............................. 2005-324140

(51) Int. Cl.
 *G06F 15/00* (2006.01)

(52) U.S. Cl. ...................................... 702/167; 702/152
(58) Field of Classification Search ................ 702/152, 702/167, 168; 33/503, 504, 700; 73/598, 73/597; 74/490.08; 144/357
See application file for complete search history.

(56) References Cited

U.S. PATENT DOCUMENTS

| | | | | |
|---|---|---|---|---|
| 4,158,258 A | * | 6/1979 | McKechnie .................. 33/521 |
| 4,188,544 A | * | 2/1980 | Chasson ................. 250/559.06 |
| 4,283,669 A | * | 8/1981 | Jacoby ........................ 318/578 |
| 4,470,122 A | * | 9/1984 | Sarr ........................... 702/150 |
| 4,665,739 A | * | 5/1987 | Mizuno ........................ 73/105 |
| 4,859,062 A | * | 8/1989 | Thurn et al. ................. 356/600 |
| 5,063,291 A | * | 11/1991 | Buehring ............... 250/231.16 |
| 5,778,551 A | | 7/1998 | Herklotz et al. |
| 6,704,684 B2 | | 3/2004 | Beck |
| 6,748,790 B2 | * | 6/2004 | Abbe ........................... 73/1.79 |
| 6,873,816 B2 | * | 3/2005 | Akashi et al. ............... 399/286 |
| 7,149,633 B2 | * | 12/2006 | Woods et al. ................. 702/40 |

(Continued)

FOREIGN PATENT DOCUMENTS

DE    195 08 861 A1    9/1996

(Continued)

OTHER PUBLICATIONS

Ohuchi et al., 'Milling of Wood and Wood-Based Materials with a Computerized Numerically Controlled Router IV: Development of Automatic Measurement System for Cutting Edge Profile of Throw-Away Type Straight Bit', 2005, Wood Science Publication, pp. 278-281.*

(Continued)

*Primary Examiner*—Edward Raymond
*Assistant Examiner*—Elias Desta
(74) *Attorney, Agent, or Firm*—Oliff & Berridge, PLC

(57) ABSTRACT

A form measuring instrument comprising: a roughness sensor placed on the table, and for outputting measurement data that includes information on the cross-sectional shape; a relative movement mechanism for relatively moving the table and the roughness sensor such that the position of the roughness sensor on the workpiece is relatively moved along the surface to be evaluated, and for outputting the amount of relative movement at a movement resolution $\Delta\theta$ as indexed-movement-amount information; a time sampler for sampling the measurement data output from the roughness sensor, at a constant time interval $t_s$; and a data processing mechanism for converting the measurement data sampled at the constant time interval $t_s$ by the time sampler to measurement data having a fixed interval according to the indexed-movement-amount information output from the relative movement mechanism.

10 Claims, 10 Drawing Sheets

U.S. PATENT DOCUMENTS

| | | | |
|---|---|---|---|
| 7,158,915 B2 * | 1/2007 | Wargon | 702/156 |
| 2002/0135782 A1 | 9/2002 | Valentin et al. | |

FOREIGN PATENT DOCUMENTS

| | | |
|---|---|---|
| JP | A 5-71952 | 3/1993 |
| JP | A 6-42942 | 2/1994 |
| JP | A 2000-136944 | 5/2000 |
| JP | A 2003-50124 | 2/2003 |
| JP | A 2004-245634 | 9/2004 |
| WO | WO 01/53775 A1 | 7/2001 |

OTHER PUBLICATIONS

C. Bradley, "Automated Surface Roughness Measurement," 2000, Int. J. Adv. Manuf. Technol, vol. 16, No. 9, pp. 668-674.

* cited by examiner

FIG. 3A

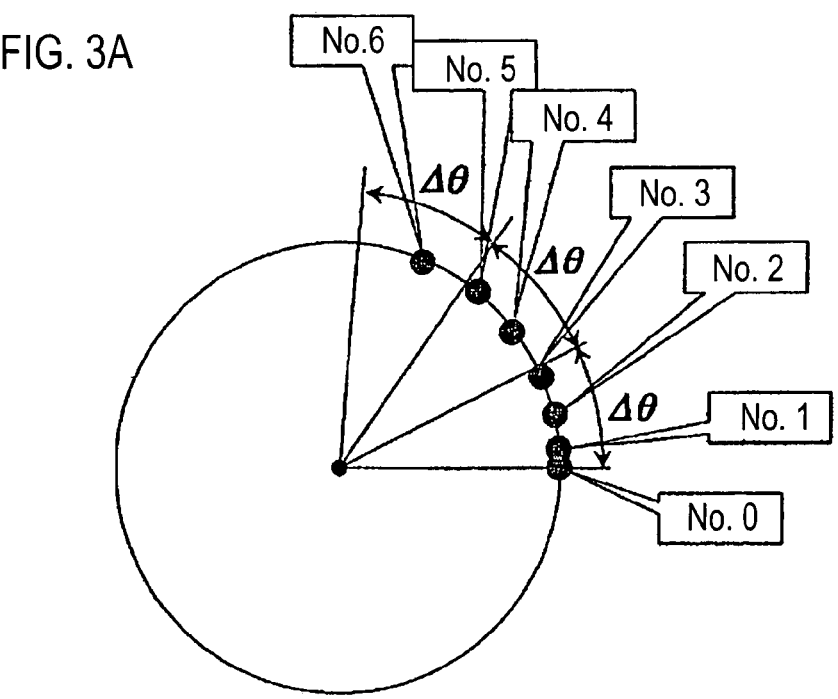

FIG. 3B

| NUMBER | MEASURED TIME | INDEXED ANGLE | MEASURED VALUE | ZONE | REQUIRED TIME | ROTATION SPEED | MEASURED ANGLE |
|---|---|---|---|---|---|---|---|
| 0 | $0t_s$ | $\theta_0$ | $r_0$ | $S_0$ | $t_0$ | $\omega_0$ | $p_{00}$ |
| 1 | $1t_s$ | $\theta_0$ | $r_1$ | $S_0$ | $t_0$ | $\omega_0$ | $p_{01}$ |
| 2 | $2t_s$ | $\theta_0$ | $r_2$ | $S_0$ | $t_0$ | $\omega_0$ | $p_{02}$ |
| 3 | $3t_s$ | $\theta_0$ | $r_3$ | $S_0$ | $t_0$ | $\omega_0$ | $p_{03}$ |
| 4 | $4t_s$ | $\theta_1$ | $r_4$ | $S_1$ | $t_1$ | $\omega_1$ | $p_{11}$ |
| 5 | $5t_s$ | $\theta_1$ | $r_5$ | $S_1$ | $t_1$ | $\omega_1$ | $p_{12}$ |
| 6 | $6t_s$ | $\theta_2$ | $r_6$ | $S_2$ | $t_2$ | $\omega_2$ | $p_{21}$ |
| N | $Nt_s$ | $\theta_m$ | $r_n$ | $S_m$ | $t_m$ | $\omega_m$ | $p_{mi}$ |

FORM MEASURING INSTRUMENT

RELATED APPLICATIONS

This application claims priority to the Japanese Patent Application 2005-324140 dated on Nov. 8, 2005 and is hereby incorporated with reference for all purposes.

BACKGROUND OF THE INVENTION

1. Field of the Invention

The present invention relates to form measuring instruments, and more particularly, to an improvement of a surface roughness measurement mechanism.

2. Prior Art

Form measuring instruments have been conventionally used to measure the shapes of workpieces precisely. Form measuring instruments include roundness measuring machines provided with a rotation mechanism, and form measuring instruments provided with a linear movement mechanism, such as surface roughness measuring machines, contour profiling measuring machines, and three dimensional coordinate measuring machines.

For example, a roundness measuring machine is used to measure the roundness of a cylindrical workpiece. A conventional roundness measuring machine includes a rotation mechanism such as a rotating table and a rotation-angle measurement device provided for the rotation mechanism. The rotation-angle measurement device obtains positional information of the cylindrical workpiece, required for roundness measurement. A general-purpose rotation-angle measurement device can be used as a conventional rotation-angle measurement device, such as those disclosed in Japanese Unexamined Patent Application Publication Nos. Hei-6-42942, 2000-136944, and 2004-245634.

In the roundness measuring machine, the cylindrical workpiece is placed on the rotating table; and while the rotating table is rotated, surface positions of the cylindrical workpiece are detected by a detector to obtain cross-sectional curve data of the cylindrical workpiece. Parameters used to measure roundness are calculated from the cross-sectional curve data obtained in this manner.

Precise measurement of a cylindrical workpiece includes surface roughness measurement in addition to roundness measurement.

Conventionally, a roundness measuring machine provided with a rotation mechanism is used for roundness measurement of a cylindrical workpiece; and a surface roughness measuring machine provided with a linear movement mechanism is used for surface roughness measurement of the cylindrical workpiece.

When separate form measuring instruments are prepared for roundness measurement and surface roughness measurement, however, a large space and a high expenditure are required.

Therefore, there has been a great demand for a single form measuring instrument that can be used for both roundness measurement and surface roughness measurement of a cylindrical workpiece. Especially for cylindrical workpieces, there has been a strong demand for the ability to use a roundness measuring machine to measure surface roughness.

When a roundness measuring machine is used for surface roughness measurement, satisfactory measurement may not be performed because the adoption of roundness measuring machines for this purpose has not yet reached a practical level: the reason for this is not fully known.

Therefore, a surface roughness measuring machine provided with a linear movement mechanism is conventionally used for surface roughness measurement of cylindrical workpieces, which can be rotated and measured with a rotation mechanism.

As described above, in this field, there is a strong demand for technology to be developed to perform more precise surface roughness measurement, but no appropriate conventional technology to make it happen has yet been obtained.

SUMMARY OF THE INVENTION

The present invention has been made in view of the above described situation. Accordingly, it is an object of the present invention to provide a form measuring instrument capable of properly performing surface roughness measurement.

The present invention has been made with attention paid to the following points.

Although detection precision in height was conventionally sought to measure surface roughness more properly, the present inventors found that it was very important to increase resolution along the measurement axis (X axis). In roughness measurement for measuring minute unevenness, the distance between uneven portions is also small and sufficient sampling should be performed at intervals corresponding to such a small distance.

To increase the resolution along the X axis, it is usual to use a higher-resolution X-axis detector for detecting the amount of movement of a roughness sensor along the X axis.

Such an X-axis detector is very expensive, however, and it is difficult to employ it in many cases. Therefore, there is a great demand for a low-resolution X-axis detector that can be used for precise roughness measurement.

To satisfy this demand, the present inventors performed a detailed investigation and found that more-precise roughness measurement can be performed even with a form measuring instrument having a low-resolution X-axis detector so long as a relative movement mechanism for outputting the amount of relative movement of a workpiece and a roughness sensor at a resolution $\Delta\theta$ and a time sampler for performing time sampling of the output of the roughness sensor are used to obtain measurement data having a fixed interval that is sufficiently small for roughness evaluation, thereby realizing the present invention.

The foregoing object is achieved by the present invention through the provision of a form measuring instrument including a table, a roughness sensor, a relative movement mechanism, time sampler, and a data processing mechanism. The data processing mechanism obtains measurement data having a fixed interval sufficiently smaller than a movement resolution $\Delta\theta$ such that the measurement data can be used for evaluating roughness with high precision.

A workpiece having a surface whose surface roughness is to be evaluated is placed on the table.

The roughness sensor detects the cross-sectional shape of the surface to be evaluated of the workpiece, placed on the table, and outputs measurement data that includes information on the cross-sectional shape.

The relative movement mechanism moves the table and the roughness sensor relative to each other such that the position of the roughness sensor on the workpiece is relatively moved, and outputs the amount of relative movement at the movement resolution $\Delta\theta$ as indexed-movement-amount information.

The time sampler time samples the measurement data output from the roughness sensor, at a constant time interval $t_s$ shorter than time required for the relative movement mechanism to move by the movement resolution $\Delta\theta$.

The data processing mechanism converts the measurement data sampled at the constant time interval $t_s$ by the time sampler to measurement data having a fixed interval according to the indexed-movement-amount information sent from the relative movement mechanism. The data processing mechanism evaluates the surface roughness of the workpiece surface to be evaluated according to the measurement data having the fixed interval.

The movement resolution $\Delta\theta$ means angular resolution $\Delta\theta$ when the relative movement mechanism is a rotation mechanism and means resolution $\Delta\theta$ related to linear movement when the relative movement mechanism is a linear movement mechanism.

The indexed-movement-amount information means rotation-angle information when the relative movement mechanism is a rotation mechanism and means linear movement amount information when the relative movement mechanism is a linear movement mechanism.

The measurement data having the fixed interval means a series of measurement data items obtained at measurement data points having a constant angular interval (fixed angular pitch) when the relative movement mechanism is a rotation mechanism and means a series of measurement data items obtained at measurement data points having a constant length interval (fixed length pitch) when the relative movement mechanism is a linear movement mechanism.

The interval or pitch is smaller than the movement resolution $\Delta\theta$ of the relative movement mechanism and is as small as required for highly precise roughness evaluation.

<Rotation Mechanism>

A roundness measuring machine is one candidate for measuring the surface roughness of a cylindrical workpiece by performing precise roughness measurement with a form measuring instrument provided with a low-resolution X-axis detector.

The present inventors extensively investigated the surface roughness measurement of a cylindrical workpiece by using a roundness measuring machine, and found that a difference in sensor characteristics and a difference in required characteristics of measurement data between roundness measurement and surface roughness measurement, described below, were reasons why it was difficult for a single form measuring instrument to perform both roundness measurement and surface roughness measurement.

First, as to the difference in sensor characteristics, components having long periods are used in roundness measurement, whereas components having short periods are used in surface roughness measurement among cross-sectional curve data measured by tracing the surface of a cylindrical workpiece to be evaluated using a detector. When a roundness detector, which detects components having long periods, is used for surface roughness measurement, it may be difficult to detect components having short periods at high precision. Therefore, measurement data which allows satisfactory surface roughness measurement cannot be obtained.

This difference in sensor characteristics can be eliminated when the roundness measuring machine has a detector holder and a roughness sensor is mounted on the roundness measuring machine by means of the detector holder.

Second, as to the difference in required characteristics of the measurement data, acquisition of accurate angular position information is more important in surface roughness measurement than in roundness measurement.

To obtain more-accurate angular position information and also to reduce costs, it was expected that the roundness measuring machine could use an indexed rotating table as a rotating table.

However, just using an indexed rotating table as a rotating table did not allow satisfactory surface roughness measurement: the reason for this is not known.

Therefore, a roundness measuring machine having an indexed rotating table and a roughness sensor has been conventionally used for both roundness measurement and surface roughness measurement, but a machine suited to both purposes has not yet been developed.

The inventors investigated this point further and found the following.

Just with an indexed rotating table, an extremely small measurement interval required for surface roughness evaluation cannot be obtained.

It was expected that a roundness measuring machine having an indexed rotating table could use time sampling instead of angular sampling.

Just with time sampling, however, when the rotation speed of the rotating table is not sufficiently stable, measurement data having a fixed angular pitch required for surface roughness evaluation may be not obtained in some cases.

It takes time until the rotation speed of the rotating table becomes sufficiently stable. In addition, even after a long time, the rotation speed of the rotating table may not be sufficiently stable. Especially in partial-circle measurement, it is necessary in some cases to perform measurement while the rotation speed of the rotating table is not sufficiently stable.

The inventors found through investigation that, to properly measure surface roughness with a rotation mechanism of the roundness measuring machine, the critical points were acquisition of measurement data having a very-small fixed pitch in length required for surface roughness evaluation and data processing that suppresses the effect of uneven rotation of the rotation mechanism as much as possible.

The inventors decided to employ the following problem-solving means based on these findings, which allow both roundness measurement and surface roughness measurement with a single measuring machine. They found that surface roughness measurement can be properly performed even with a roundness measuring machine. This allowed the present invention to be realized.

More specifically, it is preferred in the present invention that the movement resolution $\Delta\theta$ be an angular resolution $\Delta\theta$; the indexed-movement-amount information be indexed angular information; the measurement data having the fixed interval be measurement data having a fixed angular pitch; the relative movement mechanism be a rotation mechanism for relatively rotating the table and the roughness sensor and for outputting the angle of rotation at the angular resolution $\Delta\theta$ as the indexed angular information; and the data processing mechanism convert the measurement data sampled at the constant time interval $t_s$ by the time sampler to measurement data having the fixed angular pitch according to the indexed angular information output from the rotation mechanism, and evaluate the surface roughness of the workpiece surface to be evaluated according to the measurement data having the fixed angular pitch.

It is preferred in the present invention that the roughness sensor be used instead of a roundness detector for a roundness measuring machine; an indexed rotating table for the roundness measuring machine be used as the table and the rotation mechanism; and the indexed rotating table place the workpiece thereon rotatably with respect to a base, and output the angle of rotation with respect to the base at the angular resolution $\Delta\theta$ as the indexed angular information.

Rotation mechanisms according to the present invention include a rotation mechanism in which the roughness sensor is rotated with respect to a workpiece and an indexed rotating table that rotates a workpiece with respect to the roughness sensor.

Workpieces used for the present invention include a workpiece that can be rotated and measured while it is rotated by the rotation mechanism. More specifically, the workpiece surface to be evaluated should be a curve in cross-section, such as a whole circle or a partial circle.

<Linear Movement Mechanism>

It is preferred in the present invention that the movement resolution $\Delta\theta$ be a movement resolution $\Delta\theta$ related to linear movement; the indexed-movement-amount information be indexed-movement-amount information related to the linear movement; the measurement data having the fixed interval be measurement data having a fixed pitch in length related to the linear movement; the relative movement mechanism be a linear movement mechanism for linearly moving the table and the roughness sensor relatively such that the position of the roughness sensor on the workpiece is relatively moved along the surface to be evaluated, and output the amount of relative movement at the movement resolution $\Delta\theta$ as the indexed-movement-amount information; and the data processing mechanism convert the measurement data sampled at the constant time interval $t_s$ by the time sampler to measurement data having the fixed pitch in length according to the indexed-movement-amount information output from the linear movement mechanism, and evaluate the surface roughness of the surface to be evaluated of the workpiece according to the measurement data having the fixed pitch in length.

<Surface Roughness Measuring Machine>

It is preferred in the present invention that as the linear movement mechanism, a linear movement mechanism for a surface roughness measuring machine be used; and the linear movement mechanism for the surface roughness measuring machine linearly move the position of the roughness sensor on the workpiece relatively along the surface to be evaluated, and output the amount of relative movement at the movement resolution $\Delta\theta$ as the indexed-movement-amount information.

<Contour Profiling Measuring Machine>

It is preferred in the present invention that the roughness sensor be used instead of a contour detector for a contour profiling measuring machine; as the linear movement mechanism, a linear movement mechanism for the contour profiling measuring machine be used; and the linear movement mechanism for the contour profiling measuring machine linearly move the position of the roughness sensor on the workpiece relatively along the surface to be evaluated, and output the amount of relative movement at the movement resolution $\Delta\theta$ as the indexed-movement-amount information.

<Three Dimensional Coordinate Measuring Machine>

It is preferred in the present invention that the roughness sensor be used instead of a detector for a three dimensional coordinate measuring machine; as the linear movement mechanism, a linear movement mechanism for the three dimensional coordinate measuring machine be used; and the linear movement mechanism for the three dimensional coordinate measuring machine linearly move the position of the roughness sensor on the workpiece relatively along the surface to be evaluated, and output the amount of relative movement at the movement resolution $\Delta\theta$ as the indexed-movement-amount information.

<Data Processing Mechanism>

It is preferred in the present invention that the data processing mechanism comprise an estimation unit; a fixed-pitch conversion unit; and evaluation unit.

The estimation unit estimates the measurement position where each measurement data item having the indexed-movement-amount information is obtained, according to the number of measurement data items having identical indexed-movement-amount information and the order of the measurement data item among the measurement data items having the identical indexed-movement-amount information.

The fixed-pitch conversion unit converts the measurement data sampled at the constant time interval $t_s$ by the time sampler to the measurement data having the fixed interval (fixed pitch in length or in angle) according to the measurement position of each measurement data, estimated by the estimation unit.

The evaluation unit evaluates the surface roughness of the surface to be evaluated of the workpiece from the measurement data having the fixed interval, obtained by the fixed-pitch conversion unit.

It is preferred in the present invention that the estimation unit comprise a time estimating section; a speed estimating section; and a position estimating section.

The time estimating section estimates time $t_m$ ($=n \times t_s$) required for movement in zone $s_m$ ($m=0, 1, 2, \ldots$) having a movement width $\Delta\theta$ and having the indexed-movement-amount information $\theta m$, according to the number "n" ($=1, 2, \ldots$) of measurement data items in zone $s_m$ and the sampling time interval $t_s$.

The speed estimating section estimates a movement speed $\omega_m$ ($=\Delta\theta/t_m$) in zone $s_m$ according to the time required in zone $s_m$, estimated by the time estimating section, and the movement width $\Delta\theta$ of zone $s_m$.

The position estimating section estimates the measurement position $p_{mi}$ ($=\theta_m+\omega_m \times i t_s$) of the i-th ($i=1, 2, \ldots$) measurement data item in zone $s_m$ according to the movement speed $\omega_m$ in zone $s_m$, estimated by the speed estimating section, and the sampling time interval $t_s$.

<Detector Holder>

In the present invention, it is preferred that a detector holder allowing changing to the roughness sensor with superior ease be provided.

The detector holder detachably mounts the roughness sensor to the form measuring instrument.

Advantages of the Present Invention

Since a form measuring instrument according to the present invention is provided with a data processing mechanism for obtaining measurement data having a fixed interval sufficiently small for roughness evaluation by using a relative movement mechanism for outputting indexed-movement-amount information and time sampler, more-proper surface roughness measurement can be performed.

<Rotation Mechanism>

In the present invention, since there is provided a data processing mechanism for obtaining measurement data having a fixed angular pitch sufficiently small for roughness evaluation by using a rotation mechanism serving as the relative movement mechanism and the time sampler, more-proper surface roughness measurement can be performed.

In the present invention, when the roughness sensor is used instead of a roundness detector for a roundness measuring machine, and as the relative movement mechanism, a rotation mechanism for the roundness measuring machine is used, the roundness measuring machine can measure surface roughness more properly.

<Linear Movement Mechanism>

Since a form measuring instrument according to the present invention is provided with a data processing mechanism for obtaining measurement data having a fixed pitch in length sufficiently small for roughness evaluation by using a linear movement mechanism serving as the relative movement mechanism and the time sampler, more-proper surface roughness measurement can be performed.

In the present invention, when a linear movement mechanism for a surface roughness measuring machine is used as the linear movement mechanism, the surface roughness measuring machine can measure surface roughness more properly.

In the present invention, when the roughness sensor is used instead of a contour detector for a contour profiling measuring machine, and a linear movement mechanism for the contour profiling measuring machine is used as the linear movement mechanism, the contour profiling measuring machine can measure surface roughness properly.

In the present invention, when the roughness sensor is used instead of a detector for a three dimensional coordinate measuring machine, and a linear movement mechanism for the three dimensional coordinate measuring machine is used as the linear movement mechanism, the three dimensional coordinate measuring machine can measure surface roughness properly.

<Data Processing Mechanism>

In the present invention, since the data processing mechanism includes the estimation unit, the fixed-pitch conversion unit, and the evaluation unit, surface roughness measurement can be performed more properly.

In the present invention, since the estimation unit includes the time estimating section, the speed estimating section, and the position estimating section, surface roughness measurement can be performed more properly.

<Detector Holder>

In the present invention, since a detector holder for detachably mounting the roughness sensor to the measuring machine is provided to facilitate changing of the detector to the roughness sensor, proper surface roughness measurement can be preformed more easily.

BRIEF DESCRIPTION OF THE DRAWINGS

FIGS. 3A and 3B are views showing measurement data obtained by time sampling at the indexed rotating table of the form measuring instrument.

DESCRIPTION OF THE PREFERRED EMBODIMENT

Figure 1A:
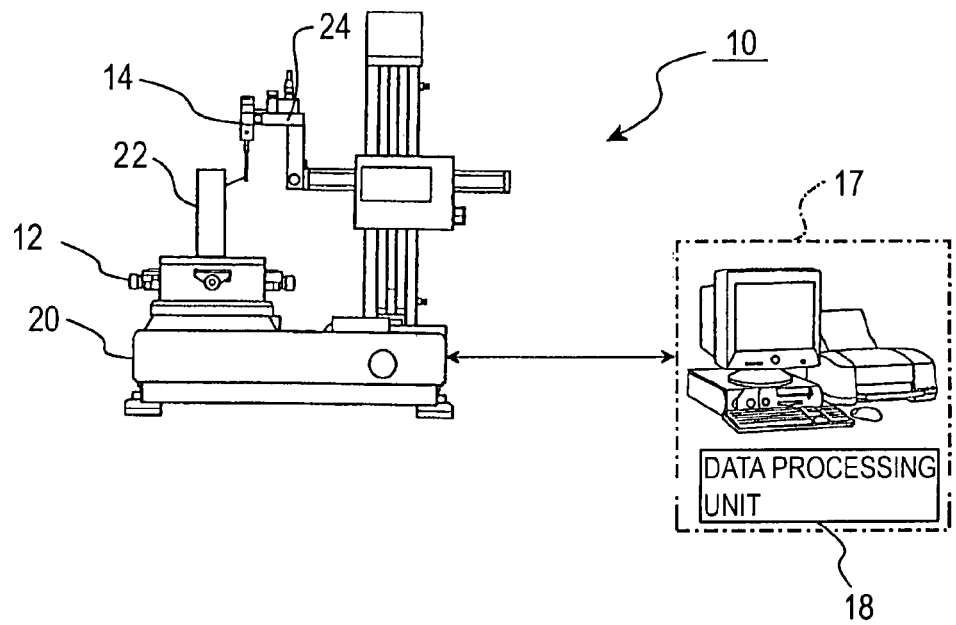
FIGS. 1A and 1B are views showing an outline structure of a form measuring instrument (roundness measuring machine) according to an embodiment of the present invention.

Preferred embodiments of the present invention will be described below by referring to the drawings.

First Embodiment

Figure 1B:
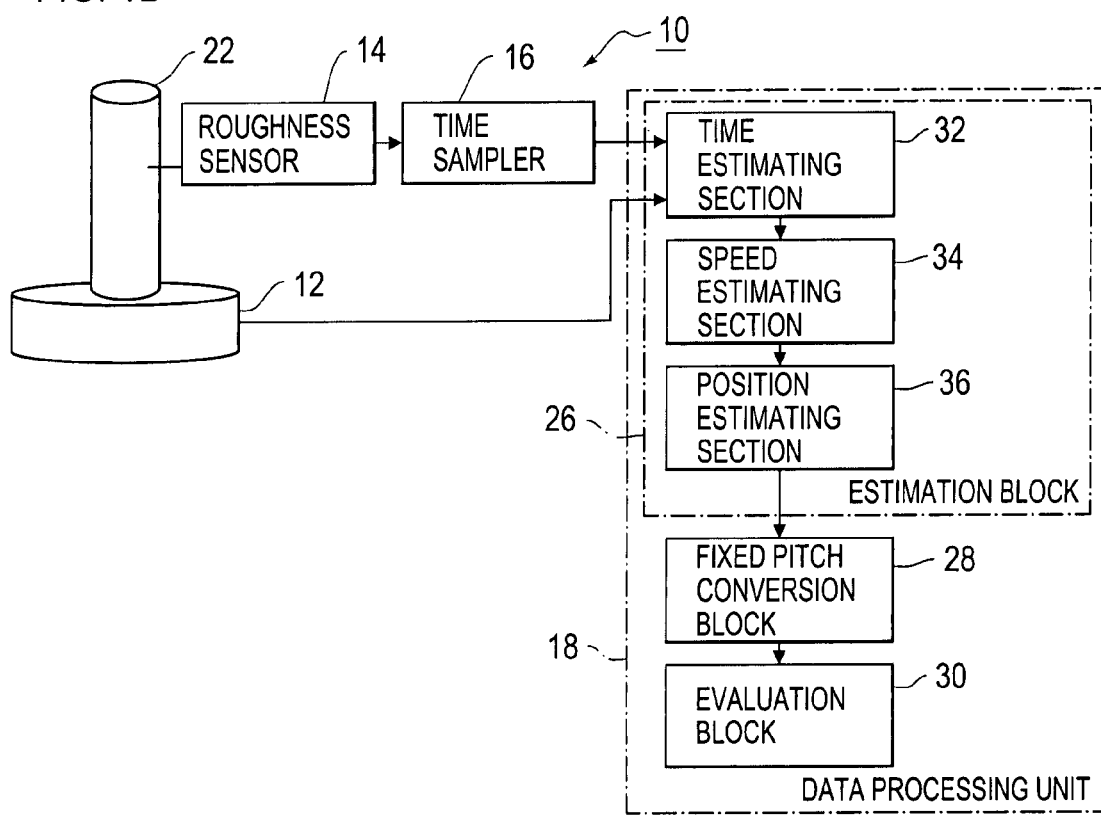

FIG. 1A shows an outline structure of a form measuring instrument according to an embodiment of the present invention, and FIG. 1B is a block diagram of the form measuring instrument.

It is assumed in the present embodiment that a roundness measuring machine provided with a rotation mechanism is used as a form measuring instrument and that a roughness sensor is used instead of a roundness detector in the roundness measuring machine.

In FIGS. 1A and 1B, a roundness measuring machine (form measuring instrument) 10 includes an indexed rotating table (serving as a table, a rotation mechanism, and a relative movement mechanism) 12, a roughness sensor 14, a time sampler 16, a data processing unit formed of a computer 17, and a detector holder 24 for detachably mounting the roughness sensor 14 to the machine.

The indexed rotating table 12 has, for example, a table and a rotation mechanism. A cylindrical workpiece 22 having a surface whose surface roughness is to be evaluated (workpiece having a surface to be evaluated and a partial circle or a whole circle in cross section) is placed on the table. To scan the workpiece surface to be evaluated by the roughness sensor, the rotation mechanism rotates (moves) the table and the roughness sensor relatively, and outputs the angle of rotation (amount of relative movement) at an angular resolution $\Delta\theta$ (a movement resolution $\Delta\theta$) as indexed angular information (indexed-movement-amount information).

The indexed rotating table 12 can rotate the cylindrical workpiece 22 with respect to a base 20, and outputs the angle of rotation with respect to the base 20 at the angular resolution $\Delta\theta$ as the indexed angular information.

The roughness sensor 14 detects a cross-sectional shape of the surface to be evaluated of the cylindrical workpiece 22 placed on the indexed rotating table 12, and outputs measurement data that includes information on the cross-sectional shape.

The time sampler 16 samples the measurement data output from the roughness sensor 14 at a constant time interval $t_s$ that is shorter than time required for the indexed rotating table 12 to rotate by the angular resolution $\Delta\theta$.

The data processing unit 18 converts the measurement data sampled at the constant time interval $t_s$ by the time sampler 16 to measurement data having a fixed angular pitch (fixed interval) according to the indexed angular information output from the indexed rotating table 12, and evaluates the surface roughness of the surface to be evaluated of the cylindrical workpiece 22 using the measurement data having the fixed angular pitch.

The data processing unit 18 includes an estimation block 26, a fixed-pitch conversion block 28, and an evaluation block 30, as shown in FIG. 1B.

Based on the number of measurement data items having identical indexed angular information (indexed-movement-amount information) and the order of the measurement data items, the estimation block 26 estimates the measurement angular position (measurement position) where each measurement data item having the identical indexed angular information was obtained.

The estimation block 26 includes a time estimating section 32, a speed estimating section 34, and a position estimating section 36.

According to the number "n" (=1, 2, . . . ) of measurement data items in zone $s_m$ (m=0, 1, 2, . . . ) having indexed angular information θm and having an angular width (movement width) Δθ, output from the indexed rotating table 12, and the sampling time interval $t_s$, the time estimating section 32 estimates time $t_m$ (n×$t_s$) for which the indexed rotating table 12 rotates (moves) through zone $s_m$.

According to the angular width (movement width) Δθ of zone $s_m$ and the required time $t_m$ of the zone $s_m$, estimated by the time estimating section 32, the speed estimating section 34 estimates the rotating angular speed (moving speed) $\omega_m$ (=Δθ/$t_m$) of the indexed rotating table 12 in zone $s_m$.

According to the rotating angular speed $\omega_m$ (=Δθ/$t_m$) in zone $s_m$, estimated by the speed estimating section 34, and the sampling time interval $t_s$, the position estimating section 36 estimates the measurement angular position (measurement position) $p_{mi}$ (=$\theta_m+\omega_m \times i t_s$) of the i-th (i=1, 2, . . . ) measurement data item in zone $s_m$.

The fixed-pitch conversion block 28 converts the measurement data obtained by the time sampler 16 to measurement data having the fixed angular pitch according to the measurement angular position of each measurement data item, estimated by the estimation block 26.

In the present embodiment, interpolation is applied to the measurement data having the constant time interval $t_s$ obtained by the time sampler 16 in order to obtain the measurement data having the fixed angular pitch.

The evaluation block 30 evaluates the surface roughness of the surface to be evaluated of the cylindrical workpiece 22, based on the measurement data having the fixed angular pitch, obtained by the fixed-pitch conversion block 28.

The roundness measuring machine 10 according to the present embodiment is structured, in outline, as described above, and its operation will be described below.

One feature of the present invention is that a single form measuring instrument can measure the roundness and surface roughness of a cylindrical workpiece, whereas two measuring machines were conventionally required: a roundness measuring machine for roundness measurement and a surface roughness measuring machine for surface roughness measurement.

In the present embodiment, the surface roughness of the cylindrical workpiece 22 is properly measured by using the indexed rotating table 12 of the roundness measuring machine 10.

To eliminate the difference in sensor characteristics required for surface roughness measurement and roundness measurement, the roughness sensor 14 is mounted on the roundness measuring machine 10 by means of the detector holder 24.

When the roughness sensor 14 is placed appropriately for the cylindrical workpiece 22 and the indexed rotating table 12 is rotated, a probe of the roughness sensor 14 is displaced along an uneven surface of the cylindrical workpiece 22. The displacement is converted to an electrical signal by the roughness sensor 14 and is then sampled and A-D converted by the time sampler 16 to numerical measurement data. The measurement data is sent to the data processing unit 18 together with indexed angular information sent from the indexed rotating table 12.

The data processing unit 18 performs data processing so as to properly measure the surface roughness of the cylindrical workpiece 22 with the use of the roundness measuring machine 10.

Since the angular resolution of an indexed rotating table employed by any current roundness measuring machines cannot satisfy the very small measurement pitch required for surface roughness evaluation, time sampling is used instead of angular sampling.

Since acquisition of fixed-pitch measurement data is required for digital filtering in surface roughness measurement, the measurement is performed when the rotation speed of the rotating table is sufficiently stable.

Measurement data obtained by time sampling does not correctly reflect the characteristics of the surface of the cylindrical workpiece, however, because the data does not correspond to a fixed pitch in length and is affected by uneven rotation. This is because it is impossible to wait for the rotation speed of the indexed rotating table to become stable, especially in partial-circle measurement, and the indexed rotating table has relatively large rotation unevenness even when measurement is performed in whole-circle measurement after the rotation speed becomes stable.

Therefore, to properly perform surface roughness measurement of the cylindrical workpiece 22 by using the roundness measuring machine, the data processing performed in the present embodiment includes acquisition of measurement data corresponding to a very small fixed measurement pitch in length required for surface roughness evaluation, and further includes processing to suppress the effect of the rotation unevenness of the indexed rotating table 12 as much as possible.

First, an estimation process is performed by the estimation block 26.

In the estimation process, based on the number of measurement data items having identical indexed angular information and the order of the measurement data items, the estimation block 26 estimates the measurement angular position where each measurement data item having the identical indexed angular information was obtained.

After the estimation process, a fixed-pitch conversion process is performed by the fixed-pitch conversion block 28.

In the fixed-pitch conversion process, the fixed-pitch conversion block 28 converts the measurement data obtained by the time sampler 16 to measurement data having the fixed angular pitch according to the measurement angular position of each measurement data item, estimated in the estimation process.

After the fixed-pitch conversion process, an evaluation process is performed by the evaluation block 30.

In the evaluation process, the evaluation block 30 evaluates the surface roughness of the surface to be evaluated of the cylindrical workpiece 22, based on the measurement data having the fixed angular pitch, obtained in the fixed-pitch conversion process.

In this way, in the present embodiment, time sampling and indexed sampling are performed simultaneously, and the measurement data having the fixed angular pitch is approximated by the measurement data obtained by the time sampler according to indexed sampling. Therefore, even partial-circle surface roughness measurement, where the rotating table is accelerated or decelerated during the measurement, can be performed properly in the present embodiment.

Next, the data processing will be described more concretely. In the data processing, the following measurement data is used.

The indexed rotating table 12 is used as a rotating table in the roundness measuring machine 10. To obtain a smaller sampling pitch, not angular sampling but time sampling is used to acquire measurement data.

Rotation-angle information obtained from the indexed rotating table 12 is attached to measurement data obtained by time sampling at the indexed rotating table 12, as indexed angular information. For example, a series of measurement data items obtained by time sampling at the sampling time interval $t_s$ with the use of the indexed rotating table 12, which has the resolution $\Delta\theta$, has rotation-angle information, that is, indexed angular information, with a pitch $\Delta\theta$.

Figure 2:
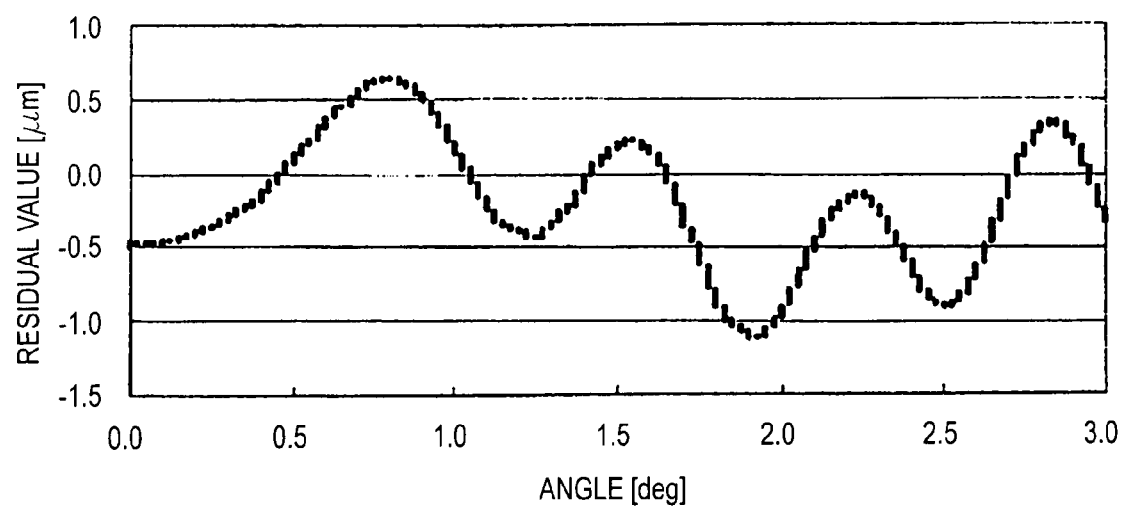
FIG. 2 is a graph showing measurement data values obtained by the form measuring instrument, plotted with respect to indexed angular information output from an indexed rotating table.

FIG. 2 shows example measurement data obtained by time sampling at the indexed rotating table 12.

FIG. 3A shows measurement data obtained by time sampling, plotted along the shape of the cylindrical workpiece 22, and FIG. 3B shows detailed measurement data obtained in the same measurement.

The data processing unit 18 obtains such measurement data, and then performs the following estimation process.

In the present embodiment, the estimation process is formed of the following time estimation process, speed estimation process, and position estimation process.

<Time Estimation>

The time estimating section 32 performs the following time estimation process.

<Time $t_m$ Required for Zone $s_m$>

Time $t_m$ required for zone $s_m$ is estimated in the following way:
(1) Extract measurement data items having indexed angular information $\theta_m$ (m=0, 1, 2, . . . ).
(2) Obtain the number "n" (=1, 2, . . . ) of extracted measurement data items.
(3) Estimate time $t_m$ (=n×$t_s$) required for the indexed rotating table 12 to turn through zone $s_m$, having the angular width $\Delta\theta$, according to the obtained number "n" of measurement data items, the sampling time interval $t_s$, and the angular width $\Delta\theta$ of zone $s_m$ corresponding to the indexed angular information $\theta m$.

With reference to FIGS. 3A and 3B, the time required for each zone will be described below in more detail.

<Time Required for Zone $s_0$>

Time $t_0$ required for zone $s_0$ is estimated in the following way:
(1) Extract measurement data items having data numbers 0, 1, 2, and 3, corresponding to indexed angular information $\theta_0$.
(2) Obtain the number "$n_0$" of extracted measurement data items, which is four.
(3) Estimate time $t_0$; (=4×$t_s$) required for the indexed rotating table 12 to turn through zone $s_0$, having the angular width $\Delta\theta$, according to the obtained number "$n_0$" of measurement data items, which is four, the sampling time interval $t_s$, and the angular width $\Delta\theta$ of zone $s_0$ corresponding to the indexed angular information $\theta_0$.

<Time Required for Zone $s_1$>

Time $t_1$ required for zone $s_1$ is estimated in the following way:
(1) Extract measurement data items having data numbers 4 and 5, corresponding to indexed angular information $\theta_1$.
(2) Obtain the number "$n_1$" of extracted measurement data items, which is two.
(3) Estimate time $t_1$ (=2×$t_s$) required for the indexed rotating table 12 to turn through zone $s_1$, having the angular width $\Delta\theta$, according to the obtained number "$n_1$" of measurement data items, which is two, the sampling time interval $t_s$, and the angular width $\Delta\theta$ of zone $s_1$ corresponding to the indexed angular information $\theta_1$.

<Time Required for Zone $s_2$>

Time $t_2$ required for zone $s_2$ is estimated in the following way:
(1) Extract measurement data items having data numbers 6, . . . , corresponding to indexed angular information $\theta_2$.
(2) Obtain the number "$n_2$" of extracted measurement data items.
(3) Estimate time $t_2$ (=$n_2$×$t_s$) required for the indexed rotating table 12 to turn through zone $s_2$, having the angular width $\Delta\theta$, according to the obtained number "$n_2$" of measurement data items, the sampling time interval $t_s$, and the angular width $\Delta\theta$ of zone $s_2$ corresponding to the indexed angular information $\theta_2$.

The indexed angular information obtained by the indexed rotating table 12 is attached to the measurement data obtained by time sampling at the indexed rotating table 12. In the present embodiment, the time "t" required for the indexed rotating table 12 to rotate by the angular width $\Delta\theta$ can be estimated as the product of the number "n" of measurement data items having identical indexed angular information and the sampling time interval $t_s$.

In the present embodiment, a trigger signal output from the computer 17 starts, at the same time, indexed sampling of indexed angular information at the indexed rotating table 12 and time sampling of the output of the roughness sensor 14 by the time sampler 16.

<Speed Estimation>

When the required time has been estimated, the speed estimating section 34 performs the following speed estimation process.

<Rotation Angular Speed in Zone $s_m$>

Rotation angular speed $\omega_m$ in zone $s_m$ is estimated in the following way.

The rotation angular speed $\omega_m$ (=$\Delta\theta/t_m$) of the indexed rotating table 12 in zone $s_m$ is estimated based on the time $t_m$ required for zone $s_m$, estimated in the time estimation process, and the angular width $\Delta\theta$ of zone $s_m$.

With reference to FIGS. 3A and 3B, the rotation angular speed in each zone will be described below in more detail.

<Rotation Angular Speed in Zone $s_0$>

Rotation angular speed $\omega_0$ in zone $s_0$ is estimated in the following way.

The rotation angular speed $\omega_0$ (=$\Delta\theta/t_0$) of the indexed rotating table 12 in zone $s_0$ is estimated based on the time $t_0$ required for zone $s_0$, estimated in the time estimation process, and the angular width $\Delta\theta$ of zone $s_0$.

<Rotation Angular Speed in Zone $s_1$>

Rotation angular speed $\omega_1$ in zone $s_1$ is estimated in the following way.

The rotation angular speed $\omega_1$ ($=\Delta\theta/t_1$) of the indexed rotating table 12 in zone $s_1$ is estimated based on the time $t_1$ required for zone $s_1$, estimated in the time estimation process, and the angular width $\Delta\theta$ of zone $s_1$.

<Rotation Angular Speed in Zone $s_2$>

Rotation angular speed $\omega_2$ in zone $s_2$ is estimated in the following way.

The rotation angular speed $\omega_2$ ($=\Delta\theta/t_2$) of the indexed rotating table 12 in zone $s_2$ is estimated based on the time $t_2$ required for zone $s_2$, estimated in the time estimation process, and the angular width $\Delta\theta$ of zone $s_2$.

In this way, the rotation angular speed $\omega$ of the indexed rotating table 12 in a minute zone having the angular width $\Delta\theta$ can be estimated from a series of measurement data items as $\omega=\Delta\theta/t$.

<Position Estimation>

When the rotation angular speed has been estimated, the position estimating section 36 performs the following position estimation process.

<Estimated Angular Position $p_{mi}$>

The measurement angular position $p_{mi}$ ($=\theta_m+\omega_m\times it_s$) of the i-th measurement data item among measurement data items obtained in zone $s_m$ is estimated in the following way.

Based on the rotation angular speed $\omega_m$ of the indexed rotating table 12 in zone $s_m$ having the indexed angular information $\theta_m$ and the sampling time interval $t_s$, the measurement angular position $p_{mi}$ ($=\theta_m+\omega_m\times it_s$) of the i-th measurement data item among measurement data items obtained in zone $s_m$ having the indexed angular information $\theta_m$ is estimated.

With reference to FIGS. 3A and 3B, estimating the measurement angular position of each measurement data item will be described below in more detail.

<Angular Position of Measurement Data Item Number 0>

The measurement angular position $p_{00}$ of the 0-th measurement data item (number 0 in the figure) among measurement data items obtained in zone $s_0$ having the indexed angular information $\theta_0$ is estimated in the following way.

Based on the rotation angular speed $\omega_0$ of the indexed rotating table 12 in zone $s_0$, estimated in the speed evaluation process, and the sampling time interval $t_s$, the measurement angular position $p_{00}$ ($=\omega_0\times 0t_s$) of the 0-th measurement data item among measurement data items obtained in zone $s_0$ is estimated. The measurement angular position $p_{00}$ is zero, for example. The following measurement angular positions can be estimated using the measurement angular position $p_{00}$ as a reference.

<Angular Position of Measurement Data Item Number 1>

The measurement angular position $P_{01}$ of the first measurement data item (number 1 in the figure) among measurement data items obtained in zone $s_0$ is estimated in the following way.

Based on the rotation angular speed $\omega_0$ of the indexed rotating table 12 in zone $s_0$ and the sampling time interval $t_s$, the measurement angular position $p_{01}$ ($=\omega_0\times 1t_s$) of the first measurement data item among measurement data items obtained in zone $s_0$ is estimated using the measurement angular position $p_{00}$ as a reference.

<Angular Position of Measurement Data Item Number 2>

The measurement angular position $P_{02}$ of the second measurement data item (number 2 in the figure) among measurement data items obtained in zone $s_0$ is estimated in the following way.

Based on the rotation angular speed $\omega_0$ of the indexed rotating table 12 in zone $s_0$ and the sampling time interval $t_s$, the measurement angular position $p_{02}$ ($=\omega_0\times 2t_s$) of the second measurement data item among measurement data items obtained in zone $s_0$ is estimated using the measurement angular position $p_{00}$ as a reference.

<Angular Position of Measurement Data Item Number 3>

The measurement angular position $p_{03}$ of the third measurement data item (number 3 in the figure) among measurement data items obtained in zone $s_0$ is estimated in the following way.

Based on the rotation angular speed $\omega_0$ of the indexed rotating table 12 in zone $s_0$ and the sampling time interval $t_s$, the measurement angular position $p_{03}$ ($=\omega_0\times 3t_s$) of the third measurement data item among measurement data items obtained in zone $s_0$ is estimated using the measurement angular position $p_{00}$ as a reference.

<Angular Position of Measurement Data Item Number 4>

The measurement angular position $p_{11}$ of the first measurement data item (number 4 in the figure) among measurement data items obtained in zone $s_1$ having the indexed angular information $\theta_1$ is estimated in the following way.

Based on the rotation angular speed $\omega_1$ of the indexed rotating table 12 in zone $s_1$ and the sampling time interval $t_s$, the measurement angular position $p_{11}$ ($=\theta_1+\omega_1\times 1t_s$) of the first measurement data item among measurement data items obtained in zone $s_1$ is estimated using the measurement angular position $p_{00}$ as a reference.

<Angular Position of Measurement Data Item Number 5>

The measurement angular position $p_{12}$ of the second measurement data item (number 5 in the figure) among measurement data items obtained in zone $s_1$ is estimated in the following way.

Based on the rotation angular speed $\omega_1$ of the indexed rotating table 12 in zone $s_1$ and the sampling time interval $t_s$, the measurement angular position $p_{12}$ ($=\theta_1+\omega_1\times 2t_s$) of the second measurement data item among measurement data items obtained in zone $s_1$ is estimated using the measurement angular position $p_{00}$ as a reference.

<Angular Position of Measurement Data Item Number 6>

The measurement angular position $P_{21}$ of the first measurement data item (number 6 in the figure) among measurement data items obtained in zone $s_2$ having the indexed angular information $\theta_2$ is estimated in the following way.

Based on the rotation angular speed $\omega_2$ of the indexed rotating table 12 in zone $s_2$ and the sampling time interval $t_s$, the measurement angular position $p_{21}$ ($=\theta_2+\omega_2\times 1t_s$) of the first measurement data item among measurement data items obtained in zone $s_2$ is estimated using the measurement angular position $p_{00}$ as a reference.

In this way, when the angular width $\Delta\theta$ of each zone is sufficiently small, it is possible to assume that the rotation of the indexed rotating table 12 has a constant speed in each zone having the angular width $\Delta\theta$. Therefore, from indexed angular information, it is also possible to estimate the measurement angular position of each measurement data obtained in the zone corresponding to the indexed angular information.

Since the angular acceleration of the indexed rotating table 12 can be estimated from the angular speed of the indexed rotating table in each zone, the angular acceleration of the indexed rotating table 12 can be used to estimate the measurement angular positions.

<Fixed-Pitch Conversion>

Figure 4:
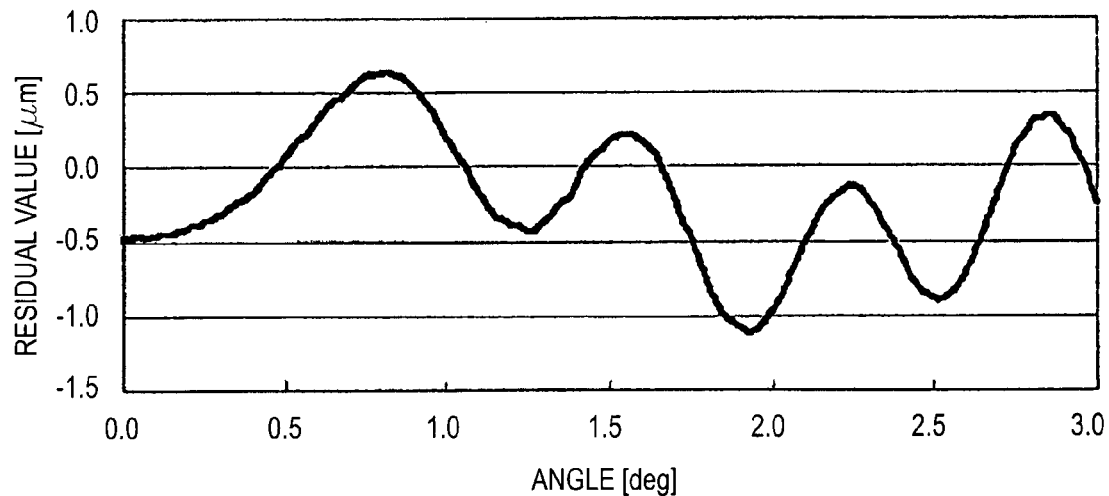
FIG. 4 is a graph showing measurement data values obtained by the form measuring instrument, plotted with respect to estimated measurement angular positions.

FIG. 4 is a view in which measurement data items output from the time sampler 16 are plotted against the measurement angular positions of the measurement data items, estimated in the estimation process.

The view does not show a series of measurement data items having a fixed angular pitch because the measurement angular positions obtained in the estimation process are used as is.

When the estimation process has been performed, a fixed-pitch conversion process converts a series of measurement data items having the fixed time interval to a series of measurement data items having a fixed angular pitch according to the measurement angular position of each sampling point (measurement data point output from the time sampler 16).

To perform this conversion, measurement angular positions are interpolated between those of the measurement data items to obtain interpolated data values by using an interpolation method, such as linear interpolation or polynomial-approximation interpolation.

Figure 5:
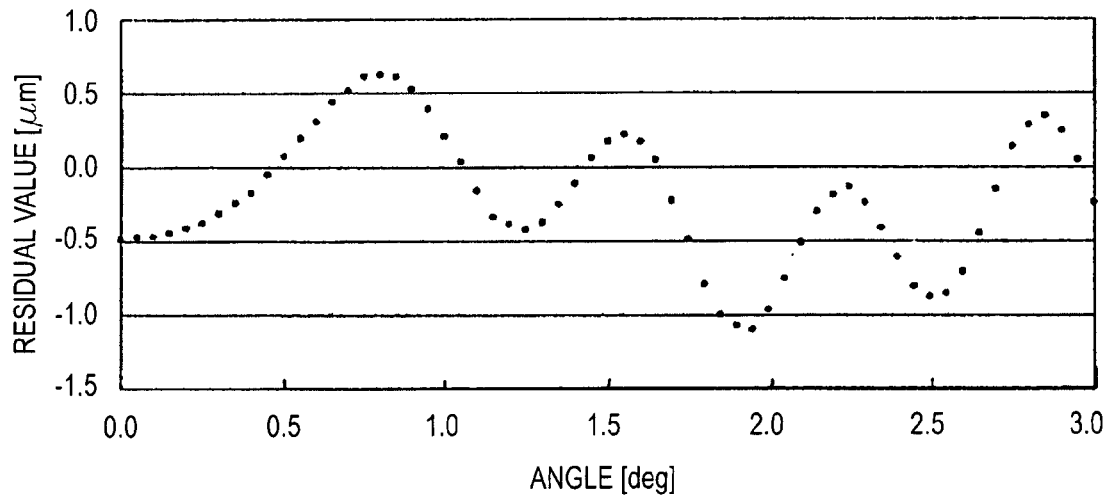
FIG. 5 is a graph showing fixed-pitch interpolated data values plotted with respect to the estimated measurement angular positions.

FIG. 5 is a view in which the interpolated data values having the fixed angular pitch, obtained in the fixed-pitch conversion process, are plotted against the measurement angular positions.

<Evaluation>

The evaluation block 30 calculates a parameter used for evaluating surface roughness, from a series of measurement data items having a fixed angular pitch, such as that shown in FIG. 5.

In an evaluation process, components having long periods are removed by a filter among the measurement data items output from the fixed-pitch conversion block 28 to leave components having short periods to calculate a surface roughness parameter.

In the present embodiment, the roughness sensor 14 is mounted to the roundness measuring machine 10 by using the detector holder 24; indexed sampling and time sampling are performed simultaneously by the indexed rotating table 12 and the time sampler 16, respectively; and the data processing, which is a feature of the present embodiment, is applied to obtained data.

As a result, surface roughness measurement data can be obtained by using the indexed rotating table 12 of the roundness measuring machine 10.

It is not necessary to wait for the indexed rotating table 12 to have stable rotation, and partial-circle surface roughness can also be measured.

By performing the data processing, the effect of uneven rotation of the indexed rotating table 12 is suppressed as much as possible.

Data having a fixed pitch in length (angle) can be obtained.

In the present embodiment, data processing is implemented with a very small fixed sampling pitch in length required for surface roughness evaluation, and also with the effect of uneven rotation being suppressed as much as possible.

Therefore, surface roughness is measured with measurement data items having the very small fixed sampling angular pitch, allowing proper measurement of surface roughness.

The present embodiment provides proper measurement of surface roughness of a cylindrical workpiece by using rotation measurement at the rotating table of the roundness measuring machine, which was extremely difficult conventionally.

<Roundness Measurement>

The roundness and surface roughness of a cylindrical workpiece can be checked by the single roundness measuring machine 10 in the present embodiment.

In the present embodiment, the roughness sensor 14 is mounted to the roundness measuring machine 10 with the detector holder 24, and a surface roughness measurement program is executed to perform surface roughness measurement. From the data measured by the roughness sensor 14, roundness evaluation can also be performed.

Roundness measurement can also be performed properly. A roundness detector is mounted on the roundness measuring machine 10 with the detector holder 24, and a roundness measurement program is executed to measure roundness. For example, in the data processing unit 18, components having short periods are removed by a filter among cross-sectional curve data output from the roundness detector to leave components having long periods to calculate a parameter for evaluating roundness according to the roundness measurement program.

<Rotation Mechanism>

In the above description, the indexed rotating table 12 is rotated relative to the roughness sensor 14. The present invention is not limited to that case, however. The present invention can also be applied to a rotation mechanism for rotating the roughness sensor 14 relative to the indexed rotating table 12.

Second Embodiment

In the first embodiment, the roundness measuring machine provided with the rotation mechanism is given as an example form measuring instrument. The present invention is not limited to that case, however. Within the scope of the present invention, the present invention can be applied to form measuring instruments provided with a linear movement mechanism, such as surface roughness measuring machines, contour profiling measuring machines, and three dimensional coordinate measuring machines.

Cases in which the present invention is applied to a surface roughness measuring machine, a contour profiling measuring machine, and a three dimensional coordinate measuring machine, which are examples of form measuring instruments provided with a linear movement mechanism, will be described below.

<Surface Roughness Measuring Machine>

To perform more-precise roughness measurement, it is preferable also for a surface roughness measuring machine to employ a combination of detecting indexed-movement-amount information, time sampling, and data processing for obtaining measurement data having a fixed pitch in length, which is a feature of the present invention. One example of a surface roughness measuring machine is the machine disclosed in Japanese Unexamined Patent Application Publication No. Hei-5-71952.

Figure 6A:
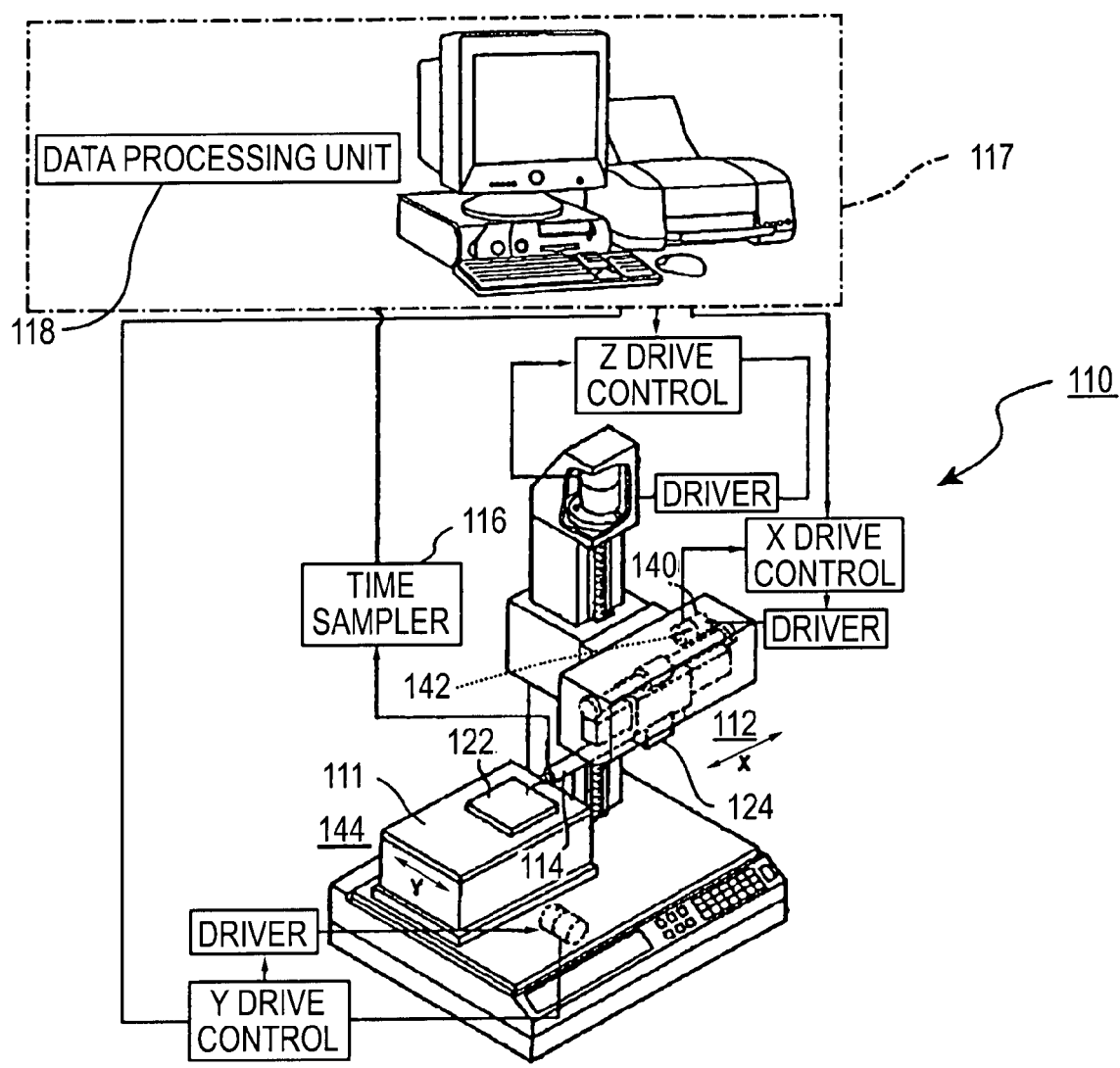
FIGS. 6A and 6B are views showing an outline structure of a form measuring instrument (surface roughness measuring machine) according to another embodiment of the present invention.
Figure 6B:
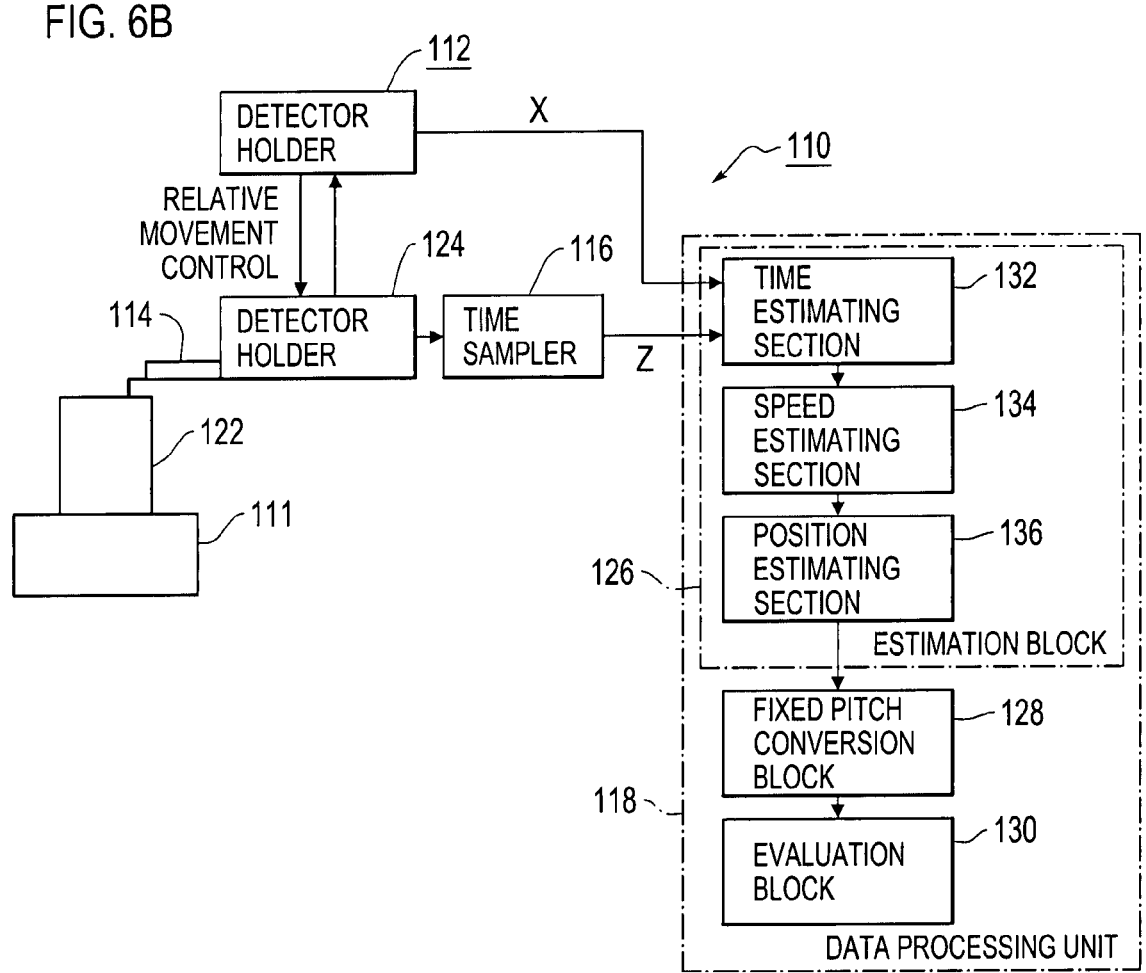

FIG. 6A is a perspective view of a surface roughness measuring machine (form measuring instrument) 110 according to a second embodiment, and FIG. 6B is a block diagram of a main part of the surface roughness measuring machine 110. Portions corresponding to those shown in FIG.

1 are indicated by the same numerals as those used in FIG. 1 plus 100, and a description thereof is omitted.

The surface roughness measuring machine 100 is provided with a roughness sensor 114.

As a relative movement mechanism, the surface roughness measuring machine 110 has a feed device (linear movement mechanism) 112. The feed device 112 includes a motor 140 and a rotary encoder (X-axis detector) 142.

The motor 140 linearly moves the roughness sensor 114 along the X axis (measurement axis).

The rotary encoder 142 detects the amount of movement made by the roughness sensor 114 along the X axis. The rotary encoder 142 outputs the amount of movement made by the roughness sensor 114 along the X axis at a movement resolution $\Delta\theta$ as indexed-movement-amount information.

A data processing unit 118 obtains measurement data having a fixed pitch in length from measurement data having a constant time interval output from a time sampler 116 according to the indexed-movement-amount information output from the feed device 112. The data processing unit 118 evaluates the surface roughness of a surface to be evaluated of a workpiece 122 according to the measurement data having the fixed pitch in length (fixed interval).

In FIGS. 6A and 6B, the workpiece 122 is placed on a Y-axis table 111.

The data processing unit 118 includes an estimation block 126, a fixed-pitch conversion block 128, and an evaluation block 130, as shown in FIG. 6B.

Based on the number of measurement data items having identical indexed-movement-amount information and the order of the measurement data items, the estimation block 126 estimates the measurement position where each measurement data item having the identical indexed angular information was obtained.

The fixed-pitch conversion block 128 converts the measurement data having the constant time interval obtained by the time sampler 116 to measurement data having the fixed pitch in length according to the measurement position of each measurement data item estimated by the estimation block 126.

The evaluation block 130 evaluates the surface roughness of the surface to be evaluated of the workpiece 122, based on the measurement data having the fixed pitch in length, obtained by the fixed-pitch conversion block 128.

The estimation block 126 includes a time estimating section 132, a speed estimating section 134, and a position estimating section 136, as shown in FIG. 6B.

According to the number "n" (=1, 2, . . . ) of measurement data items in zone $s_m$ (m=0, 1, 2, . . . ) having indexed-movement-amount information $\theta m$ and having a movement width $\Delta\theta$, and a sampling time interval $t_s$, the time estimating section 132 estimates time $t_m$ (n×$t_s$) required for linear movement in zone $s_m$.

According to the movement width $\Delta\theta$ of zone $s_m$ and the time $t_m$ required for zone $s_m$, estimated by the time estimating section 132, the speed estimating section 134 estimates linear movement speed $\omega_m$ (=$\Delta\theta/t_m$) in zone $s_m$.

According to the linear movement speed $\omega_m$ in zone $s_m$, estimated by the speed estimating section 134, and the sampling time interval $t_s$, the position estimating section 136 estimates the measurement position $p_{mi}$ (=$\theta_m+\omega_m\times it_s$) of the i-th (i=1, 2, . . . ) measurement data item in zone $s_m$.

As described above, in the surface roughness measuring machine 110, provided with the roughness sensor 114, a combination of the feed device 112, serving as a relative movement mechanism, the time sampler 116, and the data processing unit 118 allows more-precise roughness measurement.

In the surface roughness measuring machine 110, the rotary encoder 142 detects the amount of movement made by the roughness sensor 114 along the X axis.

To allow more-precise roughness measurement, a high-resolution X-axis detector is used to increase the resolution along the X axis.

Since the distance between uneven portions along the X axis is minute in roughness measurement for measuring minute unevenness, it is necessary to sufficiently detect unevenness at that distance in sampling by increasing the resolution along the X axis. Pairs of data items formed of the output of the roughness sensor 114 and the output of the rotary encoder 142 are sampled, and various roughness parameters are calculated from the pairs of data items.

Since high-resolution X-axis detectors are very expensive, however, there is a great demand for using low-resolution X-axis detectors in precise roughness measurement.

To satisfy this demand, as shown in FIG. 6B, a combination of the feed device 112, the time sampler 116, and the data processing unit 118 is employed. With this combination, even if the X-axis detector has a low resolution, a precise surface roughness measuring machine can be made at a low cost.

In the above description, the rotary encoder 142 is used as an X-axis detector. The present invention is not limited to this case, however. A linear encoder may be used. In that case, the same advantages as when the rotary encoder 142 is used are obtained.

As shown in FIG. 6A, a Y-axis driving mechanism 144 that includes the Y-axis table 11 is provided. It is not required for X-axis roughness measurement. Roughness along the Y axis, which is perpendicular to the X axis, can be measured by stopping an X-axis driving mechanism, which includes the feed device 112, and moving the roughness sensor 114 along the Y axis by the Y-axis driving mechanism 144.

Surface roughness may be measured in any desired direction by applying simultaneous two-axis control to the X-axis driving mechanism and the Y-axis driving mechanism.

Contour Profiling Measuring Machine

In general-purpose contour profiling measuring machines, a contour detector has a wider measurement area but a lower resolution than a roughness sensor, and an X-axis detector has a low resolution. Therefore, the contour profiling measuring machines are not suited to roughness measurement which requires a resolution of about 0.1 μm or higher.

Even with such a contour profiling measuring machine, when a roughness sensor is used instead of the contour detector and surface roughness measurement according to the present invention is applied, surface roughness can be measured precisely.

A contour profiling measuring machine capable of precise surface roughness measurement will be described below in detail.

Figure 7A:
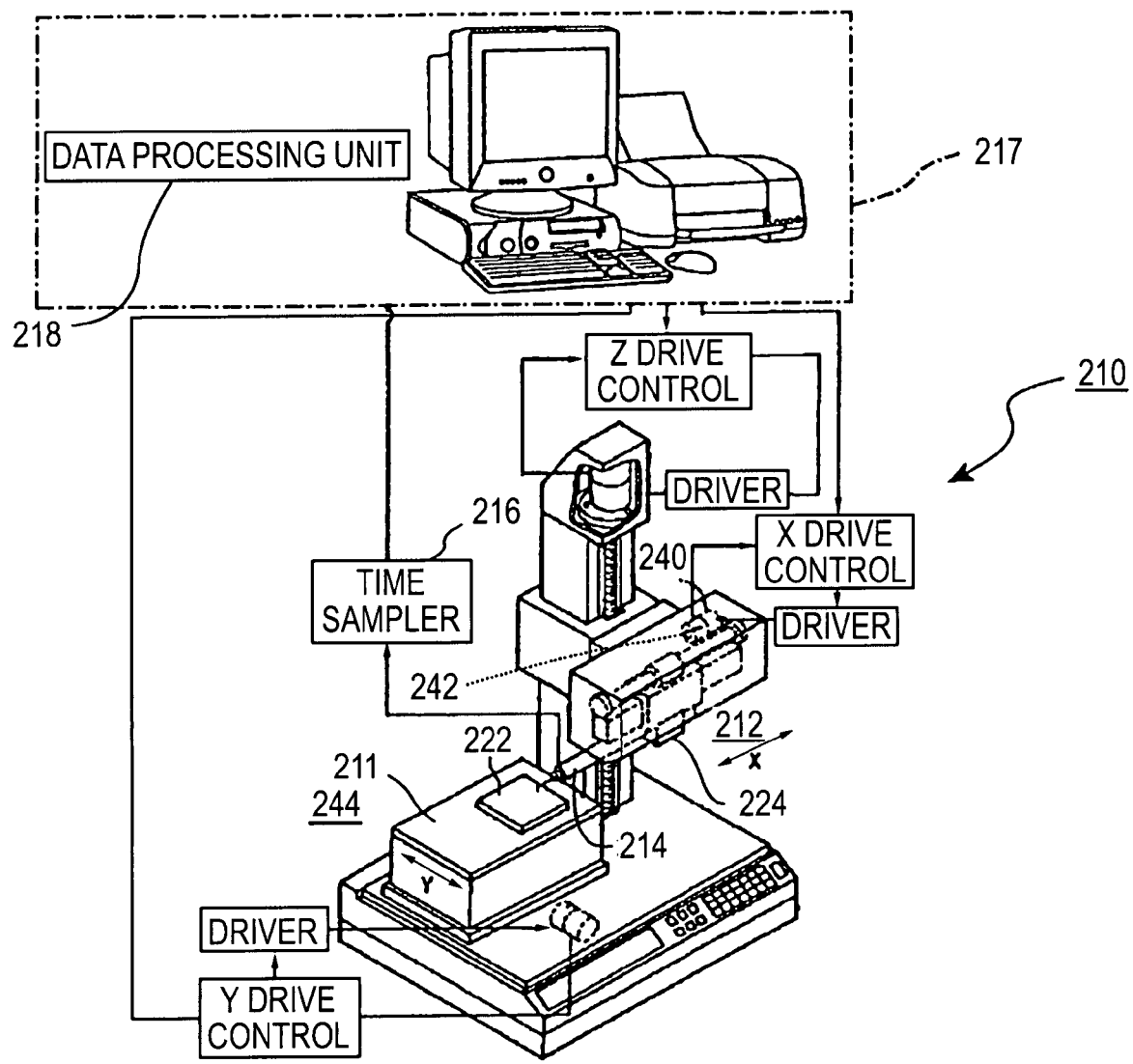
FIGS. 7A and 7B are views showing an outline structure of a form measuring instrument (contour profiling measuring machine) according to another embodiment of the present invention.
Figure 7B:
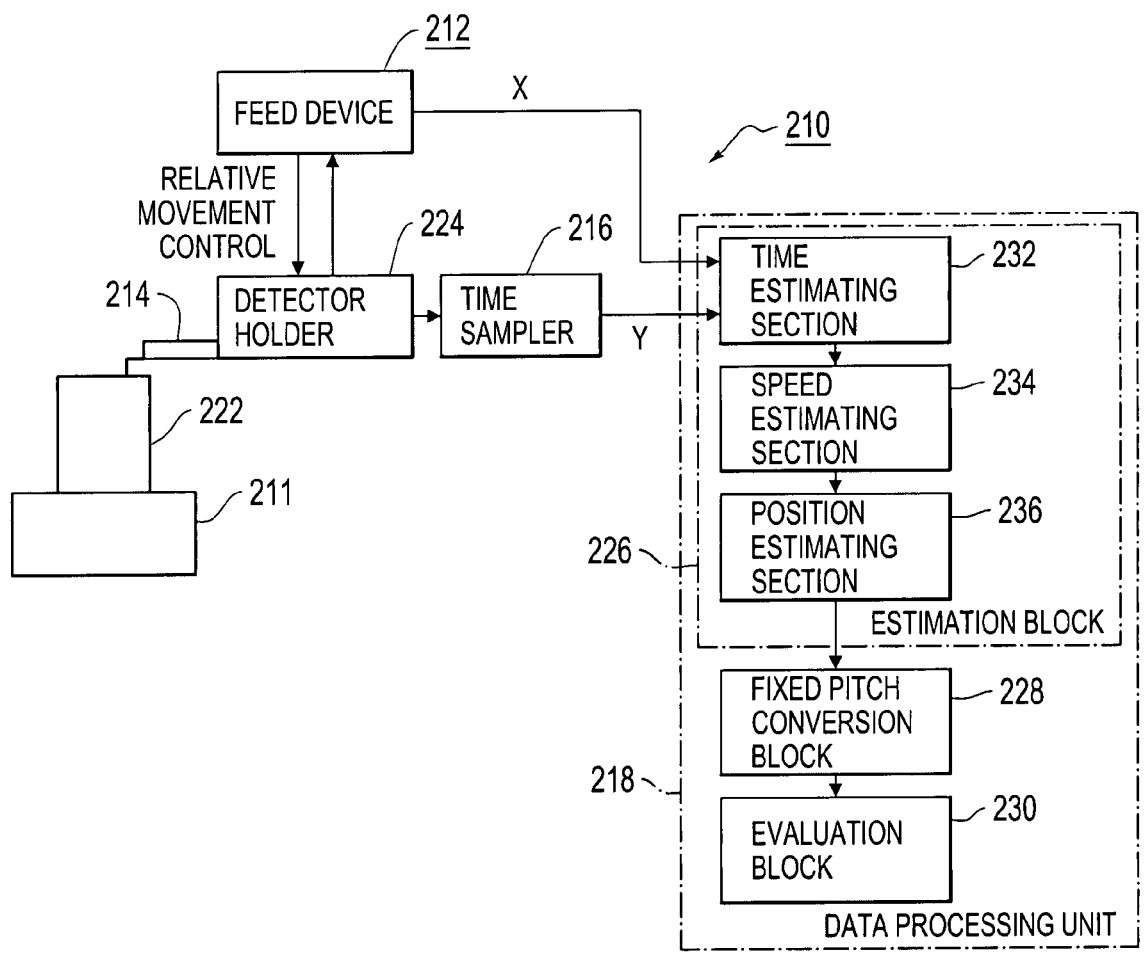

FIG. 7A is a perspective view of a contour profiling measuring machine (form measuring instrument) 210 according to the second embodiment, and FIG. 7B is a block diagram of the main part of the contour profiling measuring machine 210. Portions corresponding to those shown in FIGS. 6A and 6B are indicated by the same numerals as those used in FIGS. 6A and 6B plus 100, and a description thereof is omitted.

The contour profiling measuring machine 210 has almost the same structure as the surface roughness measuring machine 110, shown in FIGS. 6A and 6B, and uses a roughness sensor 214 instead of a contour detector. The contour profiling measuring machine 210 is provided with a detector holder 224 for detachably mounting the roughness sensor 214 to the machine 210.

A feed device 212 is used as a linear movement mechanism.

Even with the contour profiling measuring machine 210, provided with a low-resolution X-axis detector, such as a linear encoder 242, surface roughness measurement according to the present invention allows precise surface roughness measurement.

Three Dimensional Coordinate Measuring Machine

General-purpose three dimensional coordinate measuring machines have a resolution of about 1 µm along the X, Y, and Z axes, which is almost the same as the contour profiling measuring machines. Therefore, the three dimensional coordinate measuring machines are not suited to roughness measurement, which requires a resolution of about 0.1 µm or higher.

Even with such a three dimensional coordinate measuring machine, when a roughness sensor is used instead of a detector at a tip of a Z-axis spindle and surface roughness measurement according to the present invention is applied, surface roughness can be measured precisely. As a three dimensional measuring apparatus, a measuring machine disclosed in Japanese Unexamined Patent Application Publication No. 2003-50124 can be used, for example.

A three dimensional coordinate measuring machine capable of precise surface roughness measurement will be described below in detail.

Figure 8A:
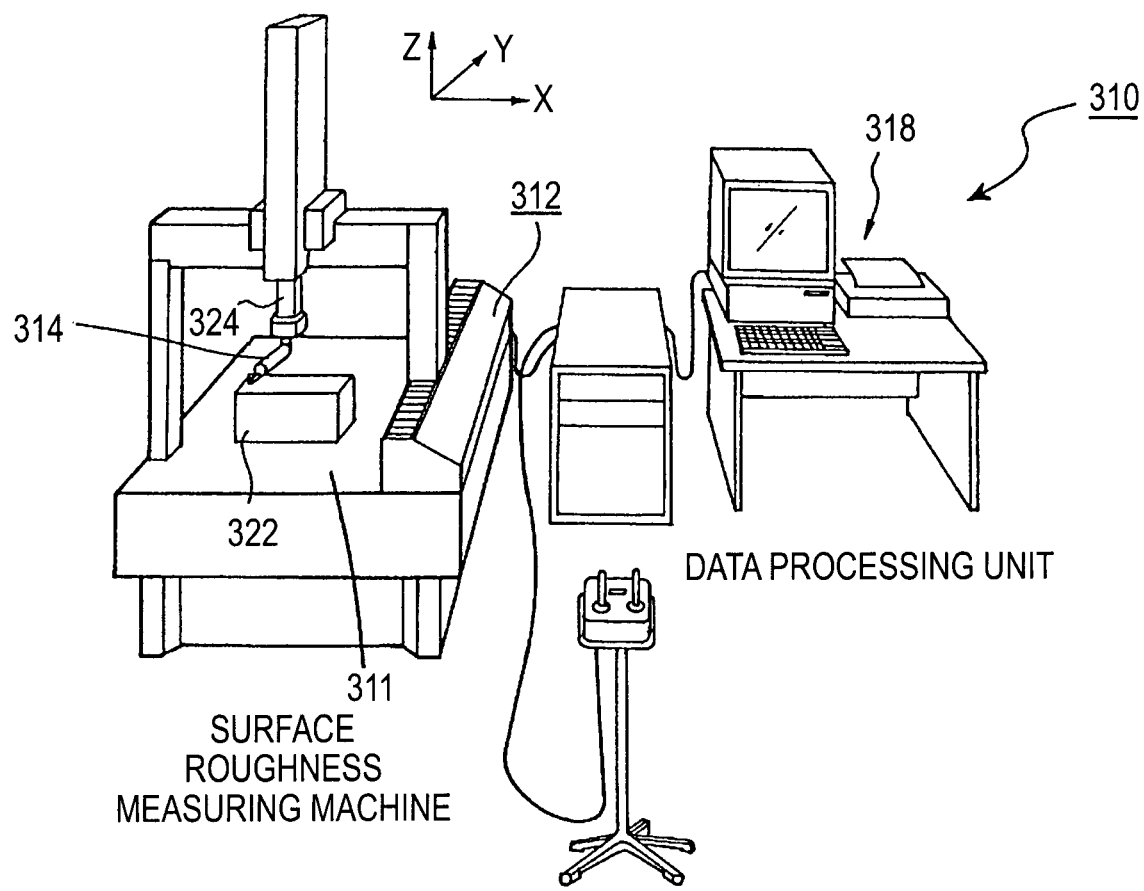
FIGS. 8A and 8B are views showing an outline structure of a form measuring instrument (three dimensional coordinate measuring machine) according to another embodiment of the present invention.
Figure 8B:
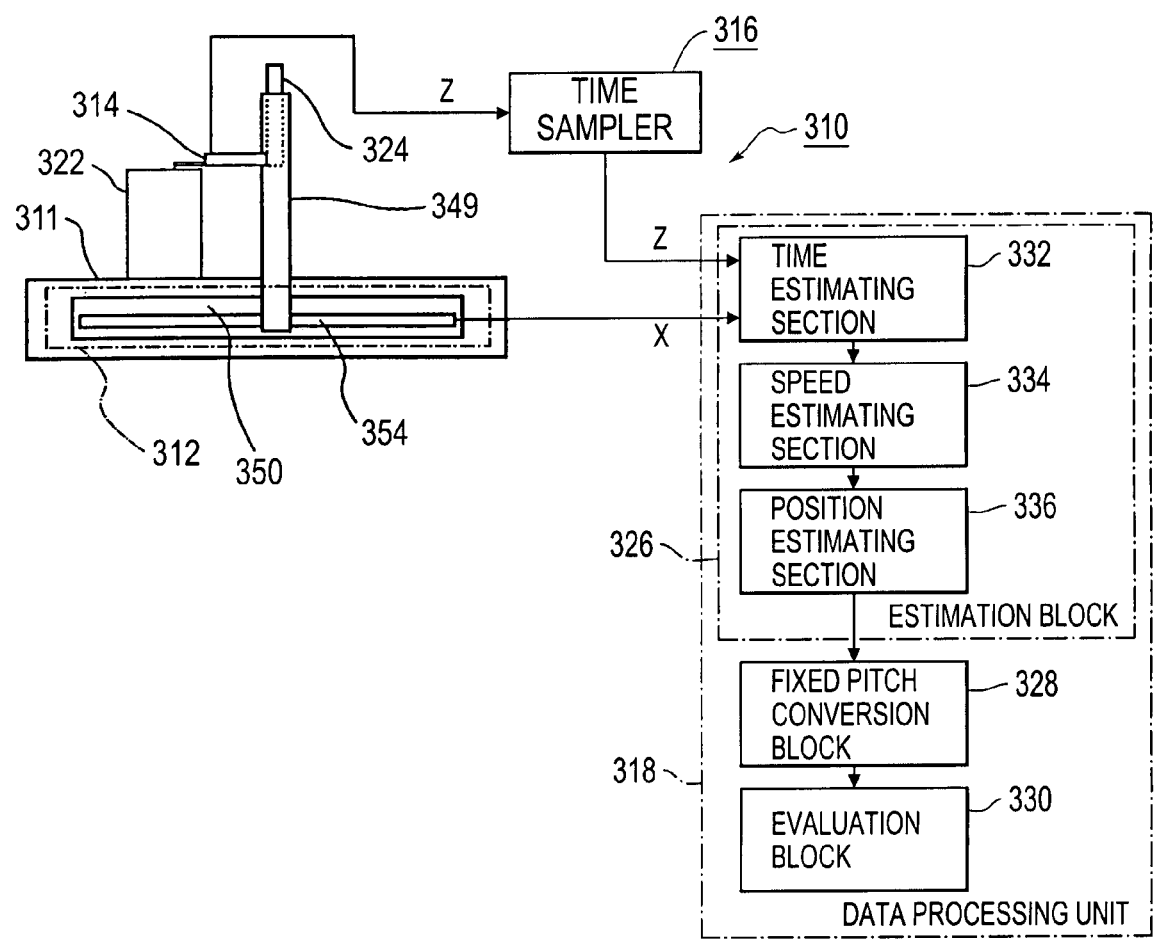

FIG. 8A is a perspective view of a three dimensional coordinate measuring machine (form measuring instrument) 310 according to the second embodiment, and FIG. 8B is a block diagram of the main part of the three dimensional coordinate measuring machine 310. Portions corresponding to those shown in FIGS. 6A and 6B are indicated by the same numerals as those used in FIGS. 6A and 6B plus 200, and a description thereof is omitted.

The three dimensional coordinate measuring machine 310 uses a roughness sensor 314 instead of a detector. A Z-axis spindle is used as a detector holder 324 for detachably mounting the roughness sensor 314 to the machine 310.

A guide 312 and a column 349 are used as a linear movement mechanism. The guide 312 includes a driving unit 350 for moving the roughness sensor 314 along the Y axis to relatively move the position of the roughness sensor 314 on a workpiece 322 placed on a table 311. The guide 312 also includes a Y-axis scale 354 for obtaining the amount of movement made by the guide 312.

The Y-axis scale 354 is used as a Y-axis detector for obtaining the amount of movement of the roughness sensor 314 along the Y axis. The Y-axis scale 354 outputs the amount of movement of the roughness sensor 314 along the Y axis at a movement resolution $\Delta\theta$ as indexed-movement-amount information.

Even with the three dimensional coordinate measuring machine 310, provided with the Y-axis scale 354, which is a low-resolution Y-axis detector, surface roughness measurement according to the present invention allows precise surface roughness measurement.

In the three dimensional coordinate measuring machine 310, surface roughness is measured along the Y axis by the movement along the Y axis. The present invention is not limited to this case, however. It is also possible that movement along the X axis or the Z axis is detected by an X-axis detector or a Z-axis detector and surface roughness is measured along the X axis or the Z axis, respectively.

In addition, surface roughness (flat-surface or curved-surface roughness) can be measured in any desired direction by simultaneous movement along two or three axes of the X, Y, and Z axes.

According to the form measuring instruments provided with a linear movement mechanism, of the present embodiment, the relative movement mechanism for obtaining the indexed-movement-amount information and the time sampler are used to obtain measurement data items having a fixed pitch in length sufficiently small for roughness measurement, in the same way as for the form measuring instrument provided with the rotation mechanism. As a result, according to the present embodiment, even when an X-axis (measurement-axis) detector has a lower resolution than that required for roughness evaluation, surface roughness can still be measured precisely.

What is claimed is:

1. A form measuring instrument comprising:
    a table on which a workpiece having a surface whose surface roughness is to be evaluated is placed;
    a roughness sensor for detecting a cross-sectional shape of the surface to be evaluated of the workpiece, placed on the table, and for outputting measurement data that includes information on the cross-sectional shape;
    a relative movement mechanism for relatively moving the table and the roughness sensor such that the position of the roughness sensor on the workpiece is relatively moved along the surface to be evaluated, and for outputting the amount of relative movement at a movement resolution $\Delta\theta$ as indexed-movement-amount information;
    a time sampler for sampling the measurement data output from the roughness sensor, at a constant time interval $t_s$ shorter than a time required for the relative movement mechanism to move the table and the roughness sensor by the movement resolution $\Delta\theta$; and
    a data processing mechanism for converting the measurement data sampled at the constant time interval $t_s$ by the time sampler to measurement data having a fixed interval, the fixed interval being smaller than the movement resolution $\Delta\theta$ of the relative movement mechanism and being required for roughness evaluation, according to the indexed-movement-amount information output from the relative movement mechanism, and for evaluating the surface roughness of the surface to be evaluated of the workpiece according to the measurement data having the fixed interval.

2. A form measuring instrument according to claim 1, wherein the movement resolution $\Delta\theta$ is an angular resolution $\Delta\theta$;
    the indexed-movement-amount information is indexed angular information;
    the measurement data having the fixed interval is measurement data having a fixed angular pitch;
    the relative movement mechanism is a rotation mechanism for relatively rotating the table and the roughness sensor and for outputting the angle of rotation at the angular resolution $\Delta\theta$ as the indexed angular information; and
    the data processing mechanism converts the measurement data sampled at the constant time interval $t_s$ by the time sampler to measurement data having the fixed angular pitch according to the indexed angular information output from the rotation mechanism, and evaluates the surface roughness of the surface to be evaluated of the workpiece according to the measurement data having the fixed angular pitch.

3. A form measuring instrument according to claim 2, wherein the roughness sensor is used instead of a roundness detector for a roundness measuring machine;
an indexed rotating table for the roundness measuring machine is used as the table and the rotation mechanism; and
the indexed rotating table places the workpiece thereon rotatably with respect to a base and outputs the angle of rotation with respect to the base at the angular resolution $\Delta\theta$ as the indexed angular information.

4. A form measuring instrument according to claim 1, wherein the movement resolution $\Delta\theta$ is a movement resolution $\Delta\theta$ related to linear movement;
the indexed-movement-amount information is indexed-movement-amount information related to the linear movement;
the measurement data having the fixed interval is measurement data having a fixed pitch in length related to the linear movement;
the relative movement mechanism is a linear movement mechanism for linearly moving the table and the roughness sensor relatively such that the position of the roughness sensor on the workpiece is relatively moved along the surface to be evaluated and for outputting the amount of relative movement at the movement resolution $\Delta\theta$ as the indexed-movement-amount information; and
the data processing mechanism converts the measurement data sampled at the constant time interval $t_s$ by the time sampler to measurement data having the fixed pitch in length according to the indexed-movement-amount information output from the linear movement mechanism, and evaluates the surface roughness of the surface to be evaluated of the workpiece according to the measurement data having the fixed pitch in length.

5. A form measuring instrument according to claim 4, wherein, as the linear movement mechanism, a linear movement mechanism for a surface roughness measuring machine is used; and
the linear movement mechanism for the surface roughness measuring machine linearly moves the position of the roughness sensor on the workpiece relatively along the surface to be evaluated and outputs the amount of relative movement at the movement resolution $\Delta\theta$ as the indexed-movement-amount information.

6. A form measuring instrument according to claim 4, wherein the roughness sensor is used instead of a contour detector for a contour profiling measuring machine;
as the linear movement mechanism, a linear movement mechanism for the contour profiling measuring machine is used; and
the linear movement mechanism for the contour profiling measuring machine linearly moves the position of the roughness sensor on the workpiece relatively along the surface to be evaluated and outputs the amount of relative movement at the movement resolution $\Delta\theta$ as the indexed-movement-amount information.

7. A form measuring instrument according to claim 4, wherein the roughness sensor is used instead of a detector for a three dimensional coordinate measuring machine;
as the linear movement mechanism, a linear movement mechanism for the three dimensional coordinate measuring machine is used; and
the linear movement mechanism for the three dimensional coordinate measuring machine linearly moves the position of the roughness sensor on the workpiece relatively along the surface to be evaluated and outputs the amount of relative movement at the movement resolution $\Delta\theta$ as the indexed-movement-amount information.

8. A form measuring instrument according to claim 1, wherein the data processing mechanism comprises:
an estimation unit for estimating the measurement position where each measurement data item having the indexed-movement-amount information is obtained, according to the number of measurement data items having identical indexed-movement-amount information and the order of the measurement data item among the measurement data items having the identical indexed-movement-amount information;
a fixed-pitch conversion unit for converting the measurement data sampled at the constant time interval $t_s$ by the time sampler to the measurement data having the fixed interval according to the measurement position of each measurement data, estimated by the estimation unit; and
an evaluation unit for evaluating the surface roughness of the surface to be evaluated of the workpiece from the measurement data having the fixed interval, obtained by the fixed-pitch conversion unit.

9. A form measuring instrument according to claim 8, wherein the estimation unit comprises:
a time estimating section for estimating time $t_m$ ($=n \times t_s$) required for movement in zone $s_m$ (m=0, 1, 2, ...) having a movement width $\Delta\theta$ and having the indexed-movement-amount information $\theta m$, according to the number "n" (=1, 2, ...) of measurement data items in zone $s_m$ and the sampling time interval $t_s$;
a speed estimating section for estimating a movement speed $\omega_m$ ($=\Delta\theta/t_m$) in zone $s_m$ according to the time required in zone $s_m$, estimated by the time estimating section, and the movement width $\Delta\theta$ of zone $s_m$; and
a position estimating section for estimating the measurement position $p_{mi}$ ($=\theta_m+\omega_m \times i t_s$) of the i-th (i=1, 2, ...) measurement data item in zone $s_m$ according to the movement speed $\omega_m$ in zone $s_m$, estimated by the speed estimating section, and the sampling time interval $t_s$.

10. A form measuring instrument according to claim 1, further comprising a detector holder for detachably mounting the roughness sensor to the form measuring instrument.

* * * * *

UNITED STATES PATENT AND TRADEMARK OFFICE
CERTIFICATE OF CORRECTION

PATENT NO. : 7,366,637 B2  Page 1 of 1
APPLICATION NO. : 11/593081
DATED : April 29, 2008
INVENTOR(S) : Tomonori Goto and Toshiyuki Tamai It is certified that error appears in the above-identified patent and that said Letters Patent is hereby corrected as shown below:

On the Title Page, Item (73) Assignee should read

-- (73) Assignee: Mitutoyo Corporation, Kawasaki-shi (JP) --.

Signed and Sealed this

Twenty-first Day of October, 2008

JON W. DUDAS
*Director of the United States Patent and Trademark Office*